Patented Aug. 21, 1945

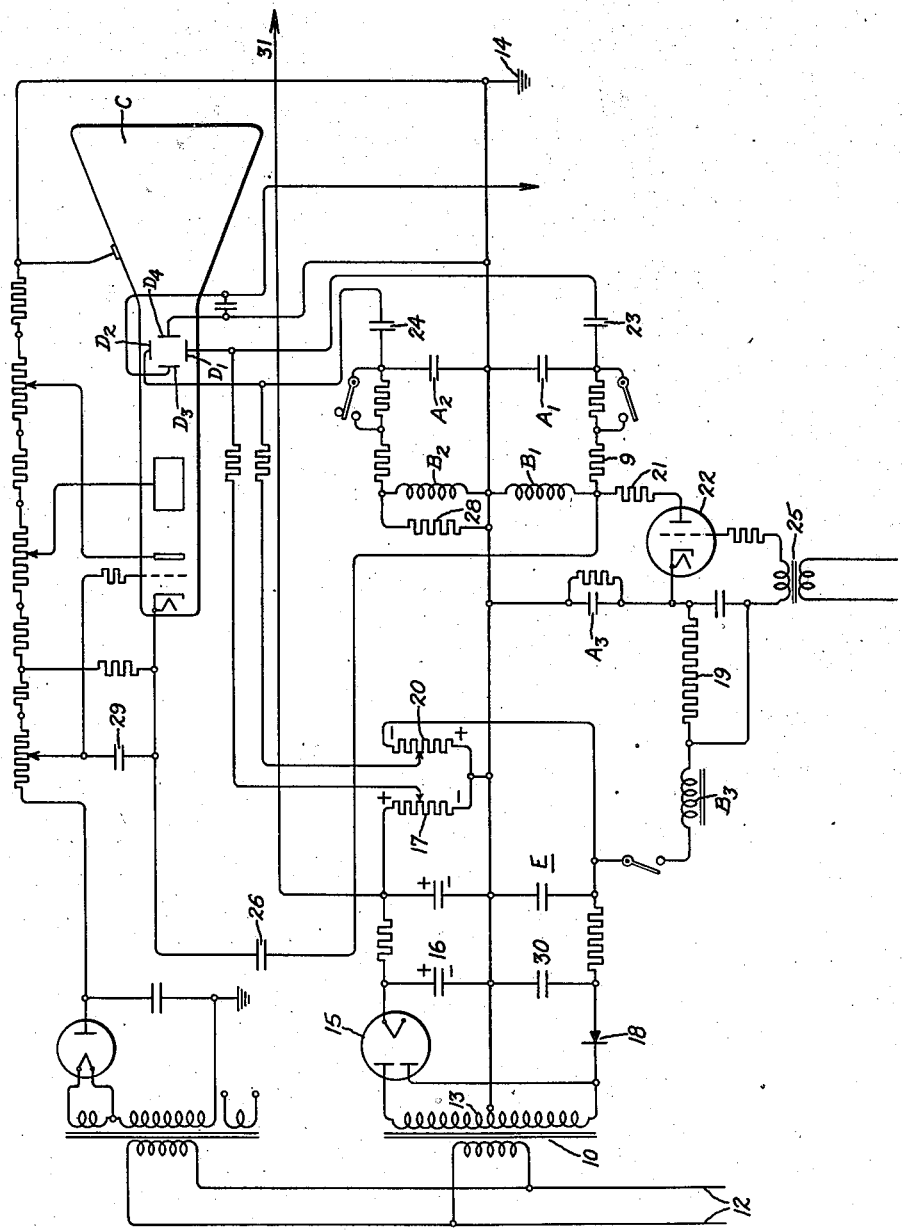

2,383,333

UNITED STATES PATENT OFFICE 2,383,333

SWEEP CIRCUIT FOR CATHODE RAY TUBES

Victor Ellis Milward, Clifton, Rugby, England, assignor to General Electric Company, a corporation of New York Application March 7, 1944, Serial No. 525,433
In Great Britain October 30, 1941

3 Claims. (Cl. 315—29)

This invention relates to sweep or beam deflecting circuits for cathode ray tubes of the electrostatically deflected type.

The potentials necessary for application to the deflecting plates of an electrostatically deflected cathode ray tube have hitherto commonly been obtained by means of condenser relaxation oscillation sweep circuits. To enable the beam to be deflected across the screen with uniform velocity, it has been necessary to provide a potential which rises linearly on a time basis. Usually in relaxation oscillation circuits the voltage of a condenser is used to deflect the beam, the charging current thereto being maintained uniform by means of a pentode type valve, or a saturated diode. The condenser is subsequently rapidly discharged by any suitable means, e. g. a controlled arc discharge device or neon lamp, with the result that saw-tooth wave form oscillations are produced.

The object of the present invention is to provide a circuit arrangement for obtaining linearly rising voltage impulses which periodically recur at intervals which are long compared with the duration of the impulses.

The invention consists in obtaining a linearly rising voltage by allowing a condenser to charge through a resistance from a source, which for the short time involved, constitutes a substantially constant voltage, the source consisting of an inductance through which a second and charged condenser having a capacity materially larger than the first condenser, is discharged through a controlled arc discharge device. The wave form of the voltage obtained by discharging the second condenser through the inductance is of cosine shape and is virtually square-topped for the short time period during which it is utilised for charging the first condenser.

The charging of the second condenser may be effected from a D. C. source through an inductance during the interval between the periodically recurring linearly rising voltages (which is, as above mentioned, long compared with those voltages). The charging circuit to the second condenser may be arranged to maintain nonconductive the controlled arc discharge device used for discharging the second condenser by utilising the voltage drop caused by passing the charging current through a resistance included in the grid control circuit of the device to place a negative bias on the control grid.

The recurrent charging and discharging of the second condenser will take place automatically at a frequency determined mainly, by the time constant of the charging inductance and the capacity of the condenser. We may however apply a synchronising pulse to the control grid of the device provided that the recurrence frequency of the pulse is slightly higher than the natural recurrence frequency of the circuit resonating free.

For the purpose of maintaining good focus of spot on the cathode ray tube, it is advisable to provide symmetrical voltages of opposite polarity on the deflector plates. This can be achieved by making the discharge inductance one half the winding of a centre tapped auto-transformer, the centre tap of which is earthed, and providing a third condenser to be charged from the other half of the transformer through a resistance.

Reference will now be made to the accompanying drawing which shows a circuit arrangement embodying the invention for illustrative purposes.

In the drawing C represents the cathode ray tube, having two pairs $D_1$, $D_2$ and $D_3$, $D_4$ of deflecting plates. Time base deflecting potentials are supplied to the plates $D_1$, $D_2$ while the voltages to be examined are applied to plates $D_3$, $D_4$. The cathode ray tube may be employed as a monitor tube in conjunction with a circuit arrangement for producing square-topped voltage impulses having a frequency of the order of 400 per second.

The linearly rising deflecting potential for application to the plate $D_1$ is obtained by charging a condenser $A_1$ from a source of voltage which for the short time required i. e. about $10\mu$ secs. may be regarded as having a constant voltage. This source is obtained by discharging a condenser $A_3$ through an inductance $B_1$ the discharge being initiated by rendering conductive a normally non-conductive controlled arc discharge device 22, and the discharge current being limited by series resistance 21. The discharge current flowing through inductance $B_1$ produces a square-topped cosine wave form voltage, the initial portion of which is sensibly constant for the short time involved, the condenser $A_1$ being charged from the terminals of inductance $B_1$ through resistance 9.

The D. C. source indicated at E comprises two rectifiers and two smoothing circuits supplied from one transformer 10. Half wave rectifier 18 and smoothing circuit 30 supplied from the lower half of centre tapped winding 13 of transformer 10 provides a source of D. C. of negative polarity to earth 14 for supplying both the sweep circuit and bias potentiometer 20 for biasing deflector plate $D_2$. Full wave rectifier 15 supplied from both halves of the centre-tapped winding 13 and smoothing circuit 16 provides a source of D. C. of positive polarity to earth 14 for supplying both an amplifier 31 (not shown) and also bias potentiometer 17. Transformer 10 is supplied from a source of alternating current 12 which may conveniently have a frequency synchronous with that of the pulse to be monitored. Condenser $A_3$ is charged through inductance $B_3$ and resistance 19 from rectifier 18 and smoothing circuit 30. The inductance B₃ controls the charging time of condenser A₃ and also causes it to charge to a potential higher than that supplied from smoothing circuit 30.

The charging current also flows through resistance 19 and produces a voltage drop thereacross which is applied to the grid of device 22 to maintain it normally non-conductive.

For the purpose of maintaining good focus of the spot on the screen of cathode ray tube C, it is advisable to provide symmetrical voltages of opposite polarity on the plates $D_1$, $D_2$. This may be effected by constituting inductance $B_1$, half the winding of a centre-tapped autotransformer, the other half of which is designated $B_2$. Across $B_2$ is developed a voltage equal and opposite to that developed across $B_1$ by the discharging of condenser $A_3$, and this voltage is used to charge a condenser $A_2$ the linearly rising voltage of which is applied to plate $D_2$. The centre tap of the auto-transformer is earthed at 14. The winding $B_2$ is shunted by a resistance 28 for damping oscillations therein. The outer terminals of condensers $A_1$, $A_2$ are connected to the respective plates $D_1$, $D_2$ through coupling condensers 23, 24 respectively. These condensers are provided to isolate from the circuit in which the deflecting potentials are produced the D. C. biasing potential which is applied to the deflecting plates $D_1$, $D_2$ from the resistances 20, 17 respectively.

In order to initiate the discharge of the condenser $A_3$ an impulse of positive voltage is applied to the control circuit of device 22 through the transformer 25. Owing to the rapidity with which the device 22 becomes fully conductive when the biasing potential is removed from its control electrode, the discharging cycle of the condenser $A_3$ can be timed with great accuracy.

For the purpose of shifting the position of image on screen of tube and also for using a length of scan greater than diameter of tube D. C. bias is applied to both scanning deflector plates of the tube. To maintain focus the circuit is made symmetrical; positive potential is applied to one plate and negative to another, these potentials being obtained from resistances 17, 20 as above described.

If recurrency frequency of image to be observed is fixed (say 400~) the main transformers may conveniently be supplied from a synchronous 400~ source which has the advantage that any magnetic interference will be synchronous with the scan and consequently will not cause defocussing.

Since it is only required to observe the scan for (say) 10μ sec. in 2500μ sec. i. e. 0.4% of time, it is essential to suppress the spot during the time it is not being viewed. This is best achieved by using sufficient bias to suppress the spot and then applying a brightening pulse during the time of scan. This is conveniently supplied by the cosine voltage wave which appears across the discharge inductance $B_1$. Since this is a negative pulse it is necessary to apply it to the cathode of the cathode ray tube. This is conveniently done by coupling condenser 26 which connects the inductance $B_1$ between the cathode and control electrode of the cathode ray tube through the biasing resistors and the biasing source in parallel. Condenser 29 is used with 26 as a potential divider to reduce the value of the brightening pulse applied to the cathode.

The circuit as a whole has the advantage that it provides voltage multiplication. If the initial D. C. supply is say 300 v. the condenser $A_3$ can be charged to say 900 v. due to the inductance in the charging circuit. Again when $A_3$ is discharged this 900 v. will provide +900 v. and −900 v. i. e. a total of 1800 v. across the auto-transformer and since only say 300 v. is required to provide the sweep of the cathode ray tube the rate of rise of voltage across condensers $A_1$ and $A_2$ will be substantially linear during the time of sweep.

What I claim as new and desire to secure by Letters Patent of the United States, is:

1. A circuit arrangement for obtaining symmetrical linearly rising voltages of short duration, comprising a first condenser, an inductance, means for charging said condenser, means for discharging said condenser through said inductance, a second condenser of materially lower capacity than said first condenser, a resistance, means for charging said second condenser through said resistance from the voltage developed across said inductance, a second inductance forming with said first mentioned inductance the winding of a centre-tapped transformer, a third condenser charged from said second inductance through a second resistance, and a controlled electric discharge device for effecting the discharge of said first condenser to provide symmetrical impulses across said second and third condensers.

2. In combination, a circuit arrangement for obtaining symmetrical linearly rising voltage of short duration, comprising a first condenser, an inductance, means for charging said condenser, means for discharging said condenser through said inductance, a second condenser of materially lower capacity than said first condenser, a resistance, means for charging said second condenser through said resistance from the voltage developed across said inductance, a second inductance forming with said first mentioned inductance the winding of a centre-tapped transformer, a third condenser charged from said second inductance, a controlled electric discharge device for effecting the discharge of said first condenser to provide symmetrical impulses across said second and third condensers, a cathode ray tube having beam deflecting plates, means for supplying said symmetrical linearly rising voltages to said deflecting plates and common means to produce a bias potential for said deflecting plates and to charge said first condenser.

3. In combination, a cathode ray tube having a cathode, a beam control electrode, and beam deflecting plates, means for obtaining linearly rising voltage impulses including an inductance, a source of voltage for producing current flow through said inductance, and a condenser charged from the voltage appearing across said inductance as a result of said current, a controlled electric discharge device for initiating current flow through said inductance, means connecting said condenser to said deflecting plates, means for maintaining between said cathode and said control electrode a beam suppressing potential, and means connecting said inductance between said control electrode and cathode, whereby to apply to said cathode simultaneously with the flow of discharge current through said inductance a potential such as to release the beam of said cathode ray tube while said beam is being deflected.

VICTOR E. MILWARD.